(12) United States Patent
Eagle

(10) Patent No.: US 11,624,012 B2
(45) Date of Patent: Apr. 11, 2023

US011624012B2

(54) EPOXY ADHESIVE RESISTANT TO OPEN BEAD HUMIDITY EXPOSURE

(71) Applicant: Dow Global Technologies LLC, Midland, MI (US)

(72) Inventor: Glenn G. Eagle, Auburn Hills, MI (US)

(73) Assignee: DDP Speciality Electronic Materials US, LLC, Wilmington, DE (US)

( * ) Notice: Subject to any disclaimer, the term of this patent is extended or adjusted under 35 U.S.C. 154(b) by 598 days.

(21) Appl. No.: 16/340,934

(22) PCT Filed: Oct. 4, 2017

(86) PCT No.: PCT/US2017/055052
§ 371 (c)(1),
(2) Date: Apr. 10, 2019

(87) PCT Pub. No.: WO2018/080747
PCT Pub. Date: May 3, 2018

(65) Prior Publication Data
US 2019/0284454 A1    Sep. 19, 2019

Related U.S. Application Data

(60) Provisional application No. 62/412,050, filed on Oct. 24, 2016.

(51) Int. Cl.
| | | |
|---|---|---|
| *C09J 163/00* | (2006.01) | |
| *C08G 59/06* | (2006.01) | |
| *C08G 59/40* | (2006.01) | |
| *C08K 3/22* | (2006.01) | |
| *C08K 3/36* | (2006.01) | |
| *C08L 21/00* | (2006.01) | |
| *C08L 51/04* | (2006.01) | |
| *C08L 63/00* | (2006.01) | |
| *C09J 5/06* | (2006.01) | |

(52) U.S. Cl.
CPC ............ *C09J 163/00* (2013.01); *C08G 59/06* (2013.01); *C08G 59/4021* (2013.01); *C08G 59/4028* (2013.01); *C08K 3/22* (2013.01); *C08K 3/36* (2013.01); *C08L 21/00* (2013.01); *C08L 51/04* (2013.01); *C08L 63/00* (2013.01); *C09J 5/06* (2013.01); *C08K 2003/2206* (2013.01); *C08L 2207/53* (2013.01)

(58) Field of Classification Search
CPC ........... C09J 163/00; C09J 5/06; C08G 59/06; C08G 59/4021; C08G 59/4028; C08K 3/22; C08K 3/36; C08K 2003/2206; C08L 21/00; C08L 51/04; C08L 63/00; C08L 2207/53

See application file for complete search history.

(56) References Cited

U.S. PATENT DOCUMENTS

| | | |
|---|---|---|
| 4,659,779 A | 4/1987 | Bagga et al. |
| 4,701,378 A | 10/1987 | Bagga et al. |
| 4,713,432 A | 12/1987 | Bagga et al. |
| 4,734,332 A | 3/1988 | Bagga et al. |
| 5,112,932 A | 5/1992 | Koenig et al. |
| 5,202,390 A | 4/1993 | Mulhaupt et al. |
| 5,278,257 A | 1/1994 | Mulhaupt et al. |
| 8,071,217 B2 | 12/2011 | Kramer et al. |
| 8,114,519 B2 | 2/2012 | Kramer et al. |
| 8,202,920 B2 | 6/2012 | Kramer et al. |
| 8,404,787 B2 | 3/2013 | Lutz et al. |
| 9,976,027 B2 | 5/2018 | Okamoto |
| 2004/0092640 A1* | 5/2004 | Makino ............ C09J 163/00 524/425 |
| 2005/0070634 A1 | 3/2005 | Lutz et al. |
| 2005/0209401 A1 | 9/2005 | Lutz et al. |
| 2006/0276601 A1 | 12/2006 | Lutz et al. |
| 2007/0066721 A1 | 3/2007 | Kramer et al. |
| 2009/0264558 A1 | 10/2009 | Kramer et al. |
| 2010/0255313 A1 | 10/2010 | Ito et al. |
| 2013/0090431 A1 | 4/2013 | Ming et al. |
| 2013/0160289 A1 | 6/2013 | Ito et al. |
| 2016/0244603 A1 | 8/2016 | Okamoto |

FOREIGN PATENT DOCUMENTS

| | | | |
|---|---|---|---|
| CA | 2971507 A1 * | 6/2016 | ........... C08G 59/504 |
| JP | 06-184511 A | 7/1994 | |
| WO | 2005118734 | 12/2005 | |
| WO | 2007003650 | 1/2007 | |
| WO | 2012091842 | 7/2012 | |

OTHER PUBLICATIONS

JP06-184511, Jul. 5, 1994, English Abstract.

\* cited by examiner

Primary Examiner — Daniel H Lee

(57) ABSTRACT

Epoxy adhesives are made using core-shell rubbers and small amounts if any of other elastomeric materials. The epoxy adhesives contain a mixture of latent curing agents and/or high levels of calcium oxide. The adhesives exhibit excellent bonding properties even when an open or closed bead is exposed to humid air for prolonged periods before the epoxy adhesive is cured.

12 Claims, No Drawings

EPOXY ADHESIVE RESISTANT TO OPEN BEAD HUMIDITY EXPOSURE

This invention relates to a new epoxy adhesive composition.

Epoxy adhesives are used extensively in the manufacture of automobiles. In applications such as these, the epoxy adhesive is almost always a "toughened" type, in which one or more elastomeric materials are incorporated into the formulation to improve fracture resistance.

In some manufacturing settings, the epoxy adhesives are sometimes applied to vehicle parts and remain there for a prolonged period of time before being cured. An open bead may remain uncured for several days during, for example, weekend plant closures. A closed bead may remain uncured for many weeks as when parts are to be shipped from stamping plants to assembly plants.

It has been found that under such circumstances the toughened epoxy adhesives used in these applications tend to foam when cured. The resulting cellular structure weakens the adhesive bond. The problem becomes worse when the applied bead has a smaller cross-sectional area.

A toughened epoxy adhesive that exhibits reduced foaming under these conditions is desired. Such an adhesive needs to exhibit adhesive properties that are comparable to extant toughened adhesive products as are used in these applications.

This invention is in one aspect a one-component, heat-curable epoxy adhesive. The adhesive comprises in admixture:

A) 45 to 75 weight percent, based on the weight of the epoxy adhesive, of a mixture of non-rubber-modified epoxy resins containing at least 80% by weight of a polyphenol polyglycidyl ether or a mixture of two or more polyphenol polyglycidyl ethers, wherein the mixture of non-rubber-modified epoxy resins is a liquid at 23° C. and has an epoxy equivalent weight of 175 to 250;

B) 12 to 25 weight percent, based on the weight of the epoxy adhesive, of core-shell rubber particles;

C) 5 to 25 weight percent, based on the weight of the epoxy adhesive, of one or more particulate inorganic fillers that include calcium oxide, wherein the calcium oxide constitutes at least 5 weight percent of the weight of the epoxy adhesive; and D) two or more latent epoxy curing agents including a first latent epoxy curing agent that becomes activated when heated to a temperature within the range of 60 to 120° C. and a second epoxy curing agent that becomes activated when heated to a temperature of at least 140° C., the two or more epoxy curing agents together being present in an amount sufficient to cure the epoxy adhesive, wherein the epoxy adhesive contains no more than 2 weight percent, based on the weight of the epoxy resins, of elastomeric compounds terminated in epoxy or epoxy-reactive groups and/or which contain urethane and/or urea groups.

The invention is also a one-component, heat-curable epoxy adhesive comprising in admixture:

A) 45 to 75 weight percent, based on the weight of the epoxy adhesive, of a mixture of non-rubber-modified epoxy resins wherein the mixture of non-rubber-modified epoxy resins is a liquid at 23° C. and has an epoxy equivalent weight of 175 to 250;

B) 12 to 25 weight percent, based on the weight of the epoxy adhesive, of core-shell rubber particles;

C) 5 to 25 weight percent, based on the weight of the epoxy adhesive, of one or more particulate inorganic fillers that include calcium oxide, wherein the calcium oxide constitutes at least 5 weight percent of the weight of the epoxy adhesive; and D) two or more latent epoxy curing agents including a first latent epoxy curing agent that becomes activated when heated to a temperature within the range of 60 to 120° C. and a second epoxy curing agent that becomes activated when heated to a temperature of at least 140° C., the two or more epoxy curing agents together being present in an amount sufficient to cure the epoxy adhesive, wherein components A) and B) together gain no more than 0.75% by weight based on the starting combined weight of components A) and B) when exposed to 80% relative humidity, 35° C. air for 7 days and the epoxy adhesive contains no more than 2 weight percent, based on the weight of the mixture of non-rubber-modified epoxy resins, of elastomeric compounds terminated in epoxy or epoxy-reactive groups and/or which contain urethane and/or urea groups.

The invention is in another aspect a one-component, heat-curable epoxy adhesive comprising in admixture:

A) 45 to 75 weight percent, based on the weight of the epoxy adhesive, of a mixture of non-rubber-modified epoxy resins containing at least 90% by weight of a polyphenol polyglycidyl ether or a mixture of two or more polyphenol polyglycidyl ethers, wherein the mixture of non-rubber-modified epoxy resins is a liquid at 23° C. and has an epoxy equivalent weight of 175 to 250;

B) 12 to 25 weight percent, based on the weight of the epoxy adhesive, of core-shell rubber particles;

C) 8 to 25 weight percent, based on the weight of the epoxy adhesive, of one or more particulate inorganic fillers that include calcium oxide, wherein the calcium oxide constitutes at least 8 weight percent of the weight of the epoxy adhesive;

D) at least one latent epoxy curing agent that becomes activated when heated to a temperature of at least 140° C., the at least one latent epoxy curing agent being present in an amount sufficient to cure the epoxy adhesive, wherein the epoxy adhesive contains no more than 2 weight percent, based on the weight of the mixture of non-rubber-modified epoxy resins, of elastomeric compounds terminated in epoxy or epoxy-reactive groups and/or which contain urethane and/or urea groups.

The invention is also a method comprising forming a layer of an epoxy adhesive of either aspect of the invention at a bondline between two substrates, and curing the layer to form an adhesive bond between the two substrates. At least one and preferably both of the substrates may be metals.

In a particular embodiment, the foregoing method includes the steps of applying the epoxy adhesive onto one of the substrates in the form of a bead having a cross-sectional area of 20 mm$^2$ or less, exposing the bead to air containing at least 5 g of water vapor per cubic meter for a period of at least 48 hours, then applying the second substrate to the adhesive bead to form an adhesive layer at a bondline and curing the adhesive layer at the bondline to form the adhesive bond.

In another particular embodiment, the foregoing method includes the steps of applying the epoxy adhesive onto one of the substrates in the form of a bead having a cross-sectional area of 20 mm$^2$ or less, applying the second substrate to the adhesive bead to form an adhesive layer at a bondline between the substrates, exposing the adhesive layer at the bondline to a temperature of up to 40° C. in air containing at least 15 g of water vapor per cubic meter for a period of at least 48 hours, then and curing the adhesive to form the adhesive bond.

The epoxy adhesive may contain 45 to 75 weight percent, based on the weight of the epoxy adhesive, of a mixture of epoxy resins. The epoxy resin mixture in some embodiments constitutes at least 48, at least 50 or at least 55 weight percent of the epoxy adhesive, and may constitute up to 70, up to 65 or up to 60 weight percent of the epoxy adhesive.

The epoxy resins are compounds containing one or more epoxide groups. The mixture of epoxy resins should have a number average of at least 1.8, preferably at least 1.9 epoxy groups per molecule. The mixture should contain no more than 10 weight percent, preferably no more than 5 weight percent, of monoepoxide compounds. Such monoepoxide compounds are sometimes present as impurities in commercially available epoxy resins. The monoepoxide compounds, for example, may include monohydrolyzed species in which one of the epoxide groups of a diepoxide has been hydrolyzed to form an α-glycol.

The mixture of non-rubber-modified epoxy resins is a liquid at 23° C. Individual components thereof may be solids at 23° C. by themselves, provided that the mixture is a liquid at that temperature.

The mixture of non-rubber-modified epoxy resins has an epoxy equivalent weight of 175 to 250. The epoxy equivalent weight of the mixture may be, for example, at least 180, at least 190 or at least 195 and may be up to 240, 230, 220 or 210. Epoxy equivalent weight can be determined by titration methods such as are set forth in ASTM D1652.

One or more polyphenol polyglycidyl ethers constitute at least 80%, preferably at least 90% or at least 95%, by weight of the mixture of epoxy resins. Polyphenol polyglycidyl ethers correspond to the reaction product of epichlorohydrin with the phenolic groups of a polyphenol compound. The polyphenol compound may be, for example, one or more of resorcinol, catechol, hydroquinone, biphenol, bisphenol A, bisphenol AP (1,1-bis(4-hydroxylphenyl)-1-phenyl ethane), bisphenol F, bisphenol K and tetramethylbiphenol a phenol-formaldehyde novolac resin (epoxy novolac resin), an alkyl substituted phenol-formaldehyde resin such as a cresol novolac resin, a phenol-hydroxybenzaldehyde resin, a cresol-hydroxybenzaldehyde resin, a dicyclopentadiene-phenol resin or a dicyclopentadiene-substituted phenol resin.

The polyphenol polyglycidyl ether may be partially advanced. In some embodiments, the partially advanced material is a oxazolidinone-containing resin formed in the reaction of an epoxy resin with a diisocyanate as described, for example, in U.S. Pat. No. 5,112,932.

Suitable commercially available polyphenol polyglycidyl ether products include diglycidyl ethers of bisphenol A resins such as are sold by Olin Corporation under the designations D.E.R.® 330, D.E.R.® 331, D.E.R.® 332, D.E.R.® 383, D.E.R. 661 and D.E.R.® 662 resins. Suitable epoxy novolac resins that are commercially available include those sold as D.E.N.® 354, D.E.N.® 431, D.E.N.® 438 and D.E.N.® 439 from Olin Corporation. An advanced epoxy-isocyanate copolymer such as those sold commercially as D.E.R. 592 and D.E.R. 6508 (Olin Corporation) can be used.

The epoxy resin mixture may contain up to 20% by weight, preferably up to 10% or up to 5%, of epoxy compounds that are not polyphenol polyglycidyl ethers. These include, for example, monoepoxides such as monohydrolyzed species as mentioned above, and other polyepoxide compounds (which are not polyphenol polyglycidyl ethers). The other polyepoxide compounds may include, for example, a diglycidyl ether of an aliphatic glycol, such as a diglycidyl ether of a $C_{2-24}$ alkylene glycol; a cycloaliphatic epoxy resin; or a combination of any two or more thereof. These other polyepoxide compounds may be absent from the epoxy resin mixture.

Commercially available diglycidyl ethers of polyglycols that are useful include those sold as D.E.R.® 732 and D.E.R.® 736 by Olin Corporation.

Suitable cycloaliphatic epoxy resins include those described in U.S. Pat. No. 3,686,359, incorporated herein by reference. Examples of cycloaliphatic epoxy resins are (3,4-epoxycyclohexyl-methyl)-3,4-epoxy-cyclohexane carboxylate, bis-(3,4-epoxycyclohexyl) adipate, vinylcyclohexene monoxide and mixtures of any two or more thereof.

The epoxy resins of the epoxy resin mixture are not rubber-modified, meaning that, prior to curing, the epoxy resin is not chemically bonded to an elastomer. The epoxy resins also lack urethane and urea groups.

In some embodiments, the epoxy resin mixture includes at least one liquid (at 23° C.) diglycidyl ether of bisphenol A, of bisphenol F, or of both bisphenol A and bisphenol F. Such an epoxy resin may further include at least one solid (at 23° C.) diglycidyl ether of bisphenol A and/or of bisphenol F. Such an epoxy resin mixture may contain up to 5% monohydrolyzed species that are present as impurities in one or more of the constituent resins.

In some embodiments, the epoxy resin mixture includes at least one liquid (at 23° C.) diglycidyl ether of bisphenol A, at least one solid (at 23° C.) diglycidyl ether of bisphenol A and at least one liquid or solid (at 23° C.) diglycidyl ether of bisphenol F, and may contain up to 5% monohydrolyzed species that are present as impurities in one or more of the constituent resins.

The core-shell rubber particles contain at least one core portion which is a rubbery material having a $T_g$ of lower than −10° C., and at least one shell portion that has a $T_g$ of at least 50° C., as measured by differential scanning calorimetry (DSC). By "core", it is meant an internal portion of the core-shell rubber. The core may form the center of the core-shell particle, or an internal shell or domain of the core-shell rubber. A shell is a portion of the core-shell rubber that is exterior to the rubbery core. The shell portion (or portions) typically forms the outermost portion of the core-shell rubber particle. The shell material is preferably grafted onto the core and/or is crosslinked.

The rubber core suitably constitutes from 50 to 90%, especially from 50 to 85% of the weight of the core-shell rubber particle.

The core-shell rubber may contain, in addition to the aforementioned materials, a central portion which is encapsulated by the rubber core. The central portion may be a hard ($T_g$>0° C., preferably >50° C. by DSC) or soft ($T_g$<0° C., preferably <−20° C.) polymer.

The rubbery core may be, for example, a polymer or copolymer of a lower alkyl acrylate such as n-butyl-, ethyl-, isobutyl- or 2-ethylhexyl-acrylate, a homopolymer or copolymer of a conjugated diene such as butadiene or isoprene, and/or a silicone rubber such as a polysiloxane polymer.

The shell polymer may be polymerized from at least one lower alkyl methacrylate such as methyl-, ethyl- or t-butyl methacrylate. Up to 40% by weight of the shell polymer can be formed from other monovinylidene monomers such as styrene, vinyl acetate, and vinyl chloride, methyl acrylate, ethyl acrylate, butyl acrylate, and the like. The shell polymer may be a homopolymer of any of such lower alkyl methacrylate monomers. The molecular weight ($M_n$) of the grafted shell polymer is generally between 20,000 and 500,000.

The core-shell rubber particles may have a number average particle size (diameter) of at 10 to 300 nanometers, especially 75 to 250 nanometers, as determined by transmission electron spectroscopy.

The core-shell rubber particles may be provided in the form of a dispersion of the particles in an epoxy resin. Such a dispersion may contain, for example, 10 to 50 weight percent of the core-shell rubbers, with the remainder being the epoxy resin. The epoxy resin in such a dispersion is preferably a polyglycidyl polyphenol ether as described above. Such dispersions include commercially available products such as Kane Ace™ MX-150, MX-154, MX-257, MX-134, MX-135, MX-136, MX-139, MX-267, MX-215, MX-217, MX-236 and MX-451, all from Kaneka Americas. When the core-shell rubber particles are provided in the form of such a dispersion, only the weight of the core-shell rubber particles is counted toward the core-shell rubber component of this invention. The weight of the epoxy resin and that of the polyglycidyl polyphenol ethers in such a dispersion is counted toward the corresponding components of this invention.

In particular embodiments, the epoxy adhesive is characterized in that components A and B) together gain no more than 0.75% by weight based on the starting combined weight of components A) and B) when exposed to 80% relative humidity, 35° C. air for 7 days (the "7 day/35° C./80% RH test"). The test is performed by forming the mixture into a 3 mm-thick film, and exposing the film to the aforementioned conditions. The film is weighed before and after exposure, and the weight gain is calculated as (final weight–starting weight)/starting weight. Alternatively, the test can be performed on the individual materials that constitute components A) and B). In such a case, the weight gain of the mixture of components A) and B) is calculated as:

$$\% \text{ Weight gain} = \frac{\sum_{1}^{i} G_i F_i}{\sum_{1}^{i} F_i} \times 100\%$$

where i represents the number of ingredients that constitute components A) and B), represents the weight gain of the $i^{th}$ ingredient on the 7 day/35° C./80% RH test and Fi represents the weight fraction of the $i^{th}$ ingredient. Preferably each ingredient that constitutes a part of component A) and component B) gains no more than 0.75% by weight on the 7 day/35° C./80% RH test.

The amount of the core-shell rubber particles in some embodiments is 15 to 25, 17.5 to 25 or 18 to 22% of the weight of the epoxy adhesive.

The epoxy adhesive of the first aspect of the invention contains at least 5 weight percent calcium oxide, based on the total weight of the adhesive. In this first aspect, the amount of calcium oxide may be at least 6 weight percent, at least 8 weight percent, at least 10 weight percent, at least 12 weight percent or at least 15 weight percent. In the second aspect of the invention, calcium oxide constitutes at least 8 weight percent of the epoxy adhesive, and may constitute at least 10, at least 12, at least 15 or at least 18 weight percent thereof. The calcium oxide preferably is present in the form of particles having an aspect ratio of 3 or lower and a number average particle size, as determined by sieving methods, of 250 nm to 500 μm.

The epoxy adhesive of either aspect of the invention may contain at least 12 weight percent, at least 15 weight percent or at least 17 weight percent, up to 25 weight percent, up to 22 weight percent, up to 20 weight percent of particulate inorganic fillers (including the weight of the calcium oxide). The particulate inorganic fillers include the weights of all room temperature solid, particulate inorganic materials (including fibers, if any) that retain their particulate nature when the epoxy adhesive is cured. The particulate inorganic fillers may act as rheology modifiers and/or desiccants.

Examples of inorganic fillers (in addition to calcium oxide) include calcium carbonate, talc, carbon black, glass, an aluminosilicate, a calcium silicate, mica, hydrated aluminum oxide, various metals, fumed silica, fly ash, glass balloons, pigments, zeolites (natural or synthetic), silica gel, an aerogel and a naturally occurring clay such as bentonite, wollastonite or kaolin.

In some embodiments, the epoxy adhesive contains 2 to 8, preferably 3 to 7 weight percent fumed silica, which, when present, is counted toward the weight of the particulate inorganic filler.

The inorganic filler (apart from the calcium oxide) may be provided in the form of low (<3) aspect ratio particles having a number average particle size, as determined by sieving methods, of 250 nm to 500 μm, and/or in the form of fibers having a diameter of 1 to 50 μm (D50, as measured by microscopy) and an aspect ratio of at least 6.

The structural adhesive also contains at least one latent curing agent.

In the first aspect of the invention, at least two latent curing agents are present. The first of these is one that becomes activated (has an activation temperature) when heated to a temperature within the range of 60 to 120° C. The second latent epoxy curing agent becomes activated when heated to a temperature of at least 140° C. In each case, the curing agent is a compound that reacts with at least two epoxy groups to form a linkage between them.

The activation temperature of a curing agent can be evaluated by combining the curing agent and a diglycidyl ether of bisphenol A having an epoxy equivalent weight of 182-192 at a stoichiometric ratio, applying the combination between two substrates, heating at various temperatures for two hours, and then in each case measuring the lap shear strength according to DIN ISO 1465. Another sample is cured 30 minutes at 180° C., which conditions represent "full cure" conditions. The "curing temperature" refers to the lowest curing temperature at which the combination achieves at least 30% of the lap shear strength obtained under the "full cure" conditions.

A suitable curing agent having an activation temperature of 60 to 120° C. is a primary and/or secondary amine compound having 2 to 12 primary and/or secondary amino groups, which amino groups are blocked with a phenolic compound and/or a carboxylic acid. Such an amine compound may be an (poly)alkylene polyamine. The amine compound may include, for example, ethylene diamine, diethylene triamine, triethylene tetraamine, tetraethylene pentaamine. The blocking group may be, for example, phenol, an alkyl-substituted phenol, benzyl alcohol, an alkyl-substituted benzyl alcohol, or an aliphatic carboxylic acid having 2 to 20 carbon atoms.

Suitable curing agents having an activation temperature of at least 140° C. include, for example, guanamines such as dicyandiamide, methyl guanidine, dimethyl guanidine, trimethyl guanidine, tetramethyl guanidine, methylisobiguanidine, dimethylisobiguanidine, tetramethylisbiguandidine, heptamethylisobiguanidine, hexamethylisobiguanidine, acetoguanamine and benzoguanamine.

In the first aspect of the invention, the first latent curing agent may constitute at least 1, at least 3 or at least 5 weight percent of the epoxy adhesive. It may constitute up to 12, up to 10 or up to 9 weight percent of the epoxy adhesive. The second latent curing agent may constitute, for example, at least 2 or at least 3 weight percent of the epoxy adhesive, up to 10, up to 8 or up to 6 weight percent of the epoxy adhesive.

In the second aspect of the invention, only the second of the aforementioned latent curing agents is required, although both types may be present. The amount of the first latent curing agent (if present) and the second latent curing agent are as described above with respect to the first aspect of the invention.

The epoxy adhesive preferably contains no more than 1 weight percent, preferably no more than 0.5 or no more than 0.25 weight percent, of curing agents that are activated at a temperature below 60° C. Such curing agents may be absent.

The epoxy adhesive contains no more than 2 weight percent, based on the weight of the mixture of non-rubber modified epoxy resins, of elastomeric compounds terminated in epoxy or epoxy-reactive groups and/or which contain urethane groups. The epoxy adhesive preferably contains no more than 1 weight percent or no more than 0.25 weight percent of such materials, and may be devoid thereof. Among these materials are compounds terminated in epoxy or epoxy-reactive groups, which further contain polyether chains of 250 molecular weight or more, one or more polysiloxane chains, diene polymers (including homopolymers of a conjugated diene such as butadiene or neoprene and copolymers of a conjugated diene and at least one other monomer), and compounds having a saturated or unsaturated aliphatic chain of about 16 or more carbon atoms. In particular, these materials include (1) diene homopolymer and copolymers terminated in amine, carboxyl and/or epoxy groups and (2) elastomeric "tougheners" having capped isocyanate groups as described, for example, in any of U.S. Pat. Nos. 5,202,390, 5,278,257, WO 2005/118734, WO 2007/003650, WO2012/091842, U. S. Published Patent Application No. 2005/0070634, U. S. Published Patent Application No. 2005/0209401, U. S. Published Patent Application 2006/0276601, EP-A-0 308 664, EP 1 498 441A, EP-A 1 728 825, EP-A 1 896 517, EP-A 1 916 269, EP-A 1 916 270, EP-A 1 916 272 and EP-A-1 916 285. The elastomeric tougheners (2) can be generally described as the products of the reaction of an amine- or hydroxyl-terminated rubber with a polyisocyanate to form an isocyanate-terminated prepolymer, optionally chain-extending the prepolymer, followed by capping the isocyanate groups with a capping group such as, for example:

a) aliphatic, aromatic, cycloaliphatic, araliphatic and/or heteroaromatic monoamines that have one primary or secondary amino group;

b) phenolic compounds, including monophenols, polyphenols and aminophenols;

c) benzyl alcohol, which may be substituted with one or more alkyl groups on the aromatic ring;

d) hydroxy-functional acrylate or methacrylate compounds;

e) thiol compounds such as alkylthiols having 2 to 30, preferably 6 to 16, carbon atoms in the alkyl group, including dodecanethiol;

f) alkyl amide compounds having at least one amine hydrogen such as acetamide and N-alkylacetamide; and g) a ketoxime.

In preferred embodiments, the epoxy adhesive contains no more than 2 weight percent, preferably no more than 1 weight percent, of any elastomeric material other than the core-shell rubber. In some embodiments, the core-shell rubber is the only elastomeric material included in the epoxy adhesive. For purposes of this invention, a material is "elastomeric" if it exhibits a glass transition temperature of −10° C. or below by DSC.

The structural adhesive of the invention may contain various other optional ingredients in addition to those described above.

A catalyst to promote the cure of the adhesive, i.e., the reaction of epoxy groups with epoxide-reactive groups of the curing agent, is an optional but preferred ingredient. The catalyst is preferably encapsulated or otherwise a latent type that becomes active only upon exposure to elevated temperatures. Among the suitable epoxy catalysts are acid- or phenol-blocked tertiary amine compounds, ureas such as p-chlorophenyl-N,N-dimethylurea (Monuron), 3-phenyl-1, 1-dimethylurea (Phenuron), 3,4-dichlorophenyl-N,N-dimethylurea (Diuron), N-(3-chloro-4-methylphenyl)-N',N'-dimethylurea (Chlortoluron), tert-acryl- or alkylene amines like benzyldimethylamine, 2,4,6-tris(dimethylaminomethyl) phenol, piperidine or derivatives thereof, various aliphatic urea compounds such as are described in EP 1 916 272; $C_1$-$C_{12}$ alkylene imidazole or N-arylimidazoles, such as 2-ethyl-2-methylimidazol, or N-butylimidazol and 6-caprolactam. Another suitable catalyst is 2,4,6-tris(dimethylaminomethyl)phenol integrated into a poly(p-vinylphenol) matrix (as described in European patent EP 0 197 892), or 2,4,6-tris(dimethylaminomethyl)phenol integrated into a novolac resin, including those described in U.S. Pat. No. 4,701,378 and US Published Patent Application No. 2013/0090431.

The catalyst may be present in an amount of at least about 0.1 weight percent of the structural adhesive, more preferably at least about 0.5 weight percent. Preferably, the catalyst constitutes up to about 4 weight percent of the structural adhesive, more preferably up to about 1.5 weight percent, and most preferably up to about 0.9 weight percent.

A monomeric or oligomeric, addition polymerizable, ethylenically unsaturated material is optionally present in the epoxy adhesive. This material should have a molecular weight of less than about 1500. This material may be, for example, an acrylate or methacrylate compound, an unsaturated polyester, a vinyl ester resin, or an epoxy adduct of an unsaturated polyester resin. A free radical initiator can be included in the structural adhesive composition as well, in order to provide a source of free radicals to polymerize this material. The inclusion of an ethylenically unsaturated material of this type provides the possibility of effecting a partial cure of the structural adhesive through selective polymerization of the ethylenic unsaturation.

The epoxy adhesive can further contain other additives such as diluents, plasticizers, extenders, pigments and dyes, fire-retarding agents, thixotropic agents, expanding agents, flow control agents, adhesion promoters and antioxidants. Any of such materials that fall within the foregoing description of the particulate inorganic filler is counted toward the weight of the particulate inorganic filler. Suitable expanding agents include both physical and chemical type agents. The structural adhesive may also contain a thermoplastic powder such as polyvinylbutyral or a polyester polyol, as described in WO 2005/118734.

In some embodiments, the mixture of non-rubber-modified epoxy resins, the core-shell rubber particles, the particulate inorganic filler(s) and the latent curing agent(s)

together constitute at least 90%, at least 93%, at least 95 or at least 97% of the total weight of the epoxy adhesive.

In some embodiments, the mixture of non-rubber-modified epoxy resins, the core-shell rubber particles, the particulate inorganic filler(s), the latent curing agent(s) and the curing catalyst(s) (if any) together constitute at least 95%, at least 97%, at least 98% or at least 99% of the total weight of the epoxy adhesive.

Substrates are bonded according to the invention by forming a layer of foregoing epoxy adhesive at a bondline between two substrates to form an assembly, and curing the epoxy adhesive at the bondline to form an adhesive bond between the two substrates.

The structural adhesive composition can be applied to the substrates by any convenient technique. It can be applied cold or be applied warm if desired. It can be applied manually and/or robotically, using, for example, a caulking gun, other extrusion apparatus, or jet spraying methods. Once the structural adhesive composition is applied, the substrates are contacted such that the adhesive is located at a bondline between the substrates.

Curing is performed by heating the epoxy adhesive to a temperature of 140° C. or above. Preferably, the temperature is about 220° C. or less, and more preferably about 180° C. or less. The time needed to achieve full cure depends somewhat on temperature, but in general is at least 5 minutes, and more typically is 15 minutes to 2 hours.

The epoxy adhesive of the invention can be used to bond a variety of substrates together including wood, metal, coated metal, aluminum, a variety of plastic and filled plastic substrates, fiberglass and the like. In one preferred embodiment, the epoxy adhesive is used to bond parts of automobiles or other vehicles. Such parts can be steel, coated steel, galvanized steel, aluminum, coated aluminum, plastic and filled plastic substrates.

An application of particular interest is in bonding vehicle frame components to each other or to other components of the vehicle. The frame components are often metals such as cold rolled steel, galvanized metals, or aluminum. The components to be bonded to the frame components can also be metals as just described, or can be other metals, plastics, composite materials, and the like.

Assembled automotive frame members are usually coated with a coating material that requires a bake cure. The coating is typically baked at temperatures that may range from 140° C. to over 200° C. In such cases, it is often convenient to apply the epoxy adhesive to the frame components, then apply the coating, and cure the epoxy adhesive at the same time the coating is baked and cured.

In some embodiments, curing is not performed immediately after the epoxy adhesive is applied. During such a delay before curing, the epoxy adhesive may be exposed to humid air at a temperature of up to about 40° C.

In some cases (the "open bead" case), the adhesive may be applied onto one of the substrates and left uncovered and exposed to ambient air for a period of time before the second substrate is brought into contact with the adhesive. In a manufacturing setting, the "open bead" case may occur, for example, when the adhesive is applied onto one of the substrates at or near the end of a working day or work week, but the next step of assembling the substrates together does not take place until work resumes on a subsequent work day.

In other cases (the "closed bead" case), the second substrate is brought into contact with the adhesive, but the adhesive is left uncured and exposed to ambient air until a later time. This case occurs in manufacturing settings wherein the step of marrying the substrates is performed, but the resulting assembly is not cured until a later time. The uncured assembly may be, for example, stored and/or transported prior to curing. In such a case, the uncured adhesive may be exposed to humid air for a period of hours to months.

Previous toughened epoxy adhesives, when exposed to humid air for extended periods, have tended to foam when cured. The foaming leaves voids in the cured adhesive, which weaken the adhesive bond.

Applicants have surprisingly found that the simultaneous selection of epoxy resins, core-shell rubber particles and proper levels of calcium oxide specifically and particulate inorganic materials generally, together with the selection of curing agent and near- or total exclusion of elastomeric compounds terminated in epoxy or epoxy-reactive groups and/or which contain urethane and/or groups, leads to a large reduction in this unwanted foaming.

The foaming problem increases with time of exposure to humid air and the surface area of the applied adhesive. In the "open bead" case, the problem is particularly acute in manufacturing settings when the bead has a cross-sectional area of less than 20 mm$^2$, when the air contains at least 15 g of water vapor per cubic meter, and the exposure time is 48 hours or longer. For atmospheric pressure air, 5 g of water vapor per cubic meter corresponds approximately to 10% relative humidity at 40° C., 17% relative humidity at 30° C. and 30% humidity at 20° C. Therefore, in some embodiments, the method of the invention includes the steps of applying the epoxy adhesive onto one of the substrates in the form of a bead having a cross-sectional area of 20 mm$^2$ or less, exposing the bead to air containing at least 5 g of water vapor per cubic meter for a period of at least 48 hours, then applying the second substrate to the adhesive bead to form a bondline and curing the adhesive to form the adhesive bond. The bead cross-sectional area may be 18 mm$^2$ or less, 15 mm$^2$ or less or 12 mm$^2$ or less. The air may contain at least 10 or at least 15 g of water vapor per cubic meter. The holding period may be at least 72 hours.

In another particular embodiment, the foregoing method includes the steps of applying the epoxy adhesive onto one of the substrates in the form of a bead having a cross-sectional area of 20 mm$^2$ or less (or 15 mm$^2$ or less or 12 mm$^2$ or less), applying the second substrate to the adhesive bead to form a bondline between the substrates, exposing the adhesive layer at the bondline to a temperature of up to 40° C. in air containing at least 5 g of water vapor per cubic meter for a period of at least 48 hours, then and curing the adhesive to form the adhesive bond. The air may contain at least 10 or at least 15 g of water vapor per cubic meter, and the period may be at least 1 week, at least 2 weeks, at least one month, or at least 2 months.

The cured adhesive in some embodiments exhibits a T-peel strength (measured according to ASTM D-1876 under the conditions described in the following examples) of at least 8, preferably at least 9 or at least 10, N/mm.

The following examples are provided to illustrate the invention but are not intended to limit the scope thereof. All parts and percentages are by weight unless otherwise indicated.

In the following examples:

Epoxy Resin A is a liquid diglycidyl ether of bisphenol A having an epoxy equivalent weight of about 187. It contains about 5% by weight monohydrolyzed species. Epoxy Resin A gains 0.35% by weight when exposed to the 7 day/35° C./80% RH moisture absorption test.

Epoxy Resin B is a mixture of solid and liquid diglycidyl ethers of bisphenol A. The mixture has an epoxy equivalent weight of about 243. It contains at most 5% by weight monohydrolyzed species. Epoxy Resin B gains 0.64% by weight when exposed to the 7 day/35° C./80% RH moisture absorption test.

Epoxy Resin C is liquid diglycidyl ether of bisphenol F having an epoxy equivalent weight of about 170. It contains at most 5% by weight monohydrolyzed species. Epoxy Resin C gains 0.61% by weight when exposed to the 7 day/35° C./80% RH moisture absorption test.

Epoxy Resin D is an epoxidized cashew nutshell oil sold commercially as Cardolite NC-514S by Cardolite Corporation. Epoxy Resin D gains 1.57-1.72% by weight when exposed to the 7 day/35° C./80% RH moisture absorption test.

The CSR (core shell rubber) Dispersion is a dispersion of 40% core-shell rubber particles having a polybutadiene rubber core in 60% liquid diglycidyl ether of bisphenol A having an epoxy equivalent weight of about 187. It is sold by Kaneka Americas under the trade name Kane Ace™ MX-150. The CSR Dispersion gains 0.35% by weight when exposed to the 7 day/35° C./80% RH moisture absorption test.

The Elastomeric Tougher is a polyether capped with blocked isocyanate groups. It contains urethane groups. It gains 1.85% by weight when exposed to the 7 day/35° C./80% RH moisture absorption test.

The Rubber-Modified Epoxy Resin is a reaction product of 20% of a carboxyl-terminated butadiene-acrylonitrile rubber and 80% of a mixture of epoxy resins. It is sold as EP815 by Huntsman.

DICY is Omicure DD-10 dicyandiamide, from CVC Thermoset Specialties. It has an activation temperature of at least 140° C.

Ancamine 2014AS is a blocked polyalkylene polyamine curing agent from Air Products. It has an activation temperature of 60-120° C.

Catalyst A is a commercial grade of a blocked tertiary amine catalyst.

Catalyst B is 2,4,6-tris(dimethylaminomethyl)phenol in an epoxy novolac resin matrix, made according to US Published Patent Application No. 2013/0090431 example 5.

A187 is a commercial grade of an epoxy silane coupling agent.

CaO is calcium oxide grade OS325 from Mississippi Lime.

CaCO$_3$ is a low aspect ratio product available commercially from Omya GmbH.

The Pigment is a particulate solid pigment (red or yellow) available commercially from BASF.

The Calcium Metasilicate is available commercially as Nyad 400 from Nyco.

The fumed silica is commercially available from Cabot Corporation as Cab-O-Sil TS720.

The Glass Balloons are 75 μm glass spheres from 3M Corporation.

The CNSL is a commercially available cashew nut shell liquid sold as Cardolite NC700 by Cardolite Corporation.

EXAMPLES 1-3 AND COMPARATIVE SAMPLES A-D

One-component, heat-curable epoxy adhesives of the first aspect of the invention (Examples 1-3) and Comparative Samples A-D are prepared by blending ingredients as indicated in Table 1:

TABLE 1

| Ingredient | A* | B* | C* | D* | 1 | 2 | 3 |
|---|---|---|---|---|---|---|---|
| | Parts by Weight | | | | | | |
| Epoxy Resin A | 40.7 | 40.7 | 40.7 | 40.7 | 0 | 0 | 0 |
| Epoxy Resin B | 0 | 0 | 0 | 0 | 19.4 | 19.4 | 19.4 |
| Epoxy Resin C | 0 | 0 | 0 | 0 | 6 | 6 | 6 |
| CSR Dispersion | 0 | 0 | 0 | 0 | 52.0 | 51.1 | 51.1 |
| Rubber-Modified Epoxy Resin | 23.8 | 23.8 | 23.8 | 23.8 | 0 | 0 | 0 |
| Elastomeric Toughener | 12.0 | 12.0 | 12.0 | 12.0 | 0 | 0 | 0 |
| CaO | 6.0 | 10.0 | 14.0 | 18.0 | 6.0 | 8.3 | 6.0 |
| CaCO$_3$ | 0 | 0 | 0 | 0 | 0 | 0 | 0 |
| Pigment | 0.3 | 0.3 | 0.3 | 0.3 | 0.3 | 0.3 | 0.3 |
| Calcium Metasilicate | 6.0 | 2.0 | 0 | 0 | 3.2 | 2.4 | 1.4 |
| Fumed Silica | 5.1 | 5.1 | 3.1 | 3.1 | 2.0 | 2.0 | 2.0 |
| Glass Balloons | 0 | 0.3 | 0.3 | 0.3 | 0 | 0 | 0 |
| DICY | 5.1 | 5.1 | 5.1 | 5.1 | 5.1 | 5.1 | 5.1 |
| Ancamine 2014AS | 0 | 0 | 0 | 0 | 5.0 | 5.0 | 8.3 |
| Catalyst A | 0.2 | 0.2 | 0.2 | 0.2 | 0.2 | 0.2 | 0.2 |
| Catalyst B | 0.6 | 0.6 | 0.6 | 0.6 | 0 | 0 | 0 |
| A-187 | 0.3 | 0.3 | 0.3 | 0.3 | 0.3 | 0.3 | 0.3 |
| % Epoxy Resins | ~55% | ~55% | ~55% | ~55% | 56.6 | 56.1 | 56.1 |
| % Core-Shell Rubber | 0 | 0 | 0 | 0 | 20.8 | 20.4 | 20.4 |
| % CaO | 6 | 10 | 14 | 18 | 6 | 8.3 | 6 |
| % Particulate Inorganic Fillers | 17.4 | 17.7 | 17.3 | 20.9 | 11.5 | 13.0 | 9.7 |

*Not an example of this invention.

A bead of Comparative Adhesive A, 5 mm high and 8 mm wide with a circular top, is applied to a 2 mm-thick sheet of 5754 aluminum alloy coated with an Alcoa 951 conversion coating and a silicone lubricant. The bead is exposed to 35° C./80% relative humidity conditions (corresponding to 31.7 g of water vapor/cubic meter) for 72 hours. A second aluminum sheet is then applied on top of the adhesive bead, to form an ASTM D1876 test panel having a 0.25 mm adhesive bond line thickness and 76 mm overlap. Excess adhesive is removed. The assembly is cured at 205° C. for 30 minutes, cooled, and T-peel strength is tested at a pull rate of 127 mm/minute. The bond strength is 9.7 N/mm. The failure mode is cohesive failure.

When this experiment is repeated with an adhesive bead only 3 mm high and 4 mm wide, the T-peel strength falls to 7 N/mm. The cured adhesive is seen to be highly porous. These experiments demonstrate the sensitivity of Comparative Adhesive A to aging. The smaller bead leads rapidly to poor results.

The foregoing experiment is repeated using each of Comparative Samples A-D and Examples 1-3, except the bead size in each case is 2.5 mm high and 6 mm wide. Results are as indicated in Table 2.

TABLE 2

| | A* | B* | C* | D* | 1 | 2 | 3 |
|---|---|---|---|---|---|---|---|
| | Sample Designation | | | | | | |
| T-Peel Strength, N/mm | 7.2 | 6.4 | 5.8 | 6.7 | 9.7 | 10.0 | 8.7 |
| Porosity Rating[1] | 1 | 1 | 1 | 1 | 2 | 2 | 2 |

*Not an example 0of this invention.
[1]1-porous through adhesive layer. 2. Porosity only at the edges of the adhesive layer.

As shown by the data in Table 1, Examples 1-3 exhibit markedly better T-peel strength and much less porosity than Comparative Samples A-D. Notably, increasing the amount of calcium oxide in the Comparative Samples does not improve porosity and in addition causes T-peel strength to deteriorate.

EXAMPLES 4-6 AND COMPARATIVE SAMPLE E

Examples 4-6 (of the second aspect of the invention) and Comparative Sample E are made and tested in in the previous examples. The formulations for these epoxy adhesives are given in Table 3. Results are as in Table 4.

TABLE 3

| Ingredient | Sample Designation | | | |
|---|---|---|---|---|
| | E* | 4 | 5 | 6 |
| | Parts by Weight | | | |
| Epoxy Resin B | 19.4 | 19.4 | 19.4 | 19.4 |
| Epoxy Resin C | 6.0 | 6.0 | 6.0 | 6.0 |
| CSR Dispersion | 51.1 | 51.1 | 51.1 | 51.1 |
| CaO | 6.0 | 10.0 | 14.0 | 18.0 |
| Pigment | 0.3 | 0.3 | 0.3 | 0.3 |
| Calcium Metasilicate | 8.0 | 4.0 | 0 | 0 |
| Fumed Silica | 2.0 | 2.0 | 2.0 | 2.0 |
| Glass Balloons | 1.0 | 1.0 | 1.0 | 1.0 |
| DICY | 5.1 | 5.1 | 5.1 | 5.1 |
| Catalyst A | 0.2 | 0.2 | 0.2 | 0.2 |
| Catalyst B | 0.6 | 0.6 | 0.6 | 0.6 |
| A-187 | 0.3 | 0.3 | 0.3 | 0.3 |
| % Epoxy Resins | ~56.1% | ~56.1% | ~56.1% | 53.9 |
| % Core-Shell Rubber | 20.4 | 20.4 | 20.4 | 19.6 |
| % CaO | 6 | 10 | 14 | 17.3 |
| % Particulate Inorganic Fillers | 17.3 | 17.3 | 17.3 | 16.6 |

*Not an example of this invention.

TABLE 4

| | Sample Designation | | | |
|---|---|---|---|---|
| | E* | 4 | 5 | 6 |
| T-Peel Strength, N/mm | 8.8 | 11.5 | 12.3 | 12.0 |
| Porosity Rating[1] | 1 | 2 | 3 | 3 |

*Not an example of this invention.
[1] 1-porous through adhesive layer. 2. Porosity only at the edges of the adhesive layer. 3. No visible porosity.

As shown by the data in Table 4, increasing the amount of calcium oxide from 6 to 10 weight percent increases T-peel strength significantly and reduces porosity. Further increasing the amount of calcium oxide further increases the T-peel strength and reduces porosity substantially. Note that the effect of increasing the amount of calcium oxide is different in this set of samples than is seen in Comparative Samples A-D above. In the presence of a urethane toughener and rubber-modified epoxy resin, increasing calcium oxide has a deleterious effect. When those materials are replaced with a core-shell rubber, increasing calcium oxide leads to very significant improvements.

EXAMPLES 7-11 AND COMPARATIVE SAMPLE F

Examples 7-11 (of the second aspect of the invention) and Comparative Sample F are made and tested in in the previous examples, except the bead size is only about 2.1 mm high and 5 mm wide. The formulations for these epoxy adhesives are given in Table 5. Results are as in Table 6.

TABLE 5

| Ingredient | Sample Designation | | | | | |
|---|---|---|---|---|---|---|
| | 7 | 8 | 9 | 10 | 11 | F* |
| | Parts by Weight | | | | | |
| Epoxy Resin A | 0 | 0 | 0 | 23.4 | 23.4 | 0 |
| Epoxy Resin B | 19.4 | 0 | 0 | 0 | 0 | 0 |
| Epoxy Resin C | 6.0 | 25.4 | 17.0 | 0 | 0 | 0 |
| Epoxy Resin D | 0 | 0 | 0 | 0 | 0 | 25.4 |
| CSNL | 0 | 0 | 0 | 2.0 | 2.7 | 0 |
| CSR Dispersion | 51.1 | 51.1 | 59.4 | 51.1 | 51.1 | 51.1 |
| CaO | 18.0 | 18.0 | 18.0 | 18.0 | 18.0 | 18.0 |
| Pigment | 0.4 | 0.4 | 0.4 | 0.4 | 0.4 | 0.4 |
| Fumed Silica | 2.0 | 2.0 | 2.0 | 2.0 | 3.0 | 2.0 |
| Glass Balloons | 2.0 | 2.0 | 2.0 | 2.0 | 2.0 | 2.0 |
| DICY | 5.1 | 5.1 | 5.1 | 5.1 | 5.1 | 5.1 |
| Catalyst A | 0.2 | 0.2 | 0.2 | 0.2 | 0.2 | 0.2 |
| Catalyst B | 0.6 | 0.6 | 0.6 | 0.6 | 0.6 | 0.6 |
| A-187 | 0.3 | 0.3 | 0.3 | 0.3 | 0.3 | 0.3 |
| % Epoxy Resins | 53.9% | 53.9 | 50.2% | 52.6 | 50.2 | 53.9 |
| % Core-Shell Rubber | 19.6 | 19.6 | 22.8 | 19.6 | 19.6 | 19.6 |
| % CaO | 17.3 | 17.3 | 17.3 | 17.3 | 17.2 | 17.3 |
| % Particulate Inorganic Fillers | 21.5 | 21.5 | 21.5 | 21.5 | 21.3 | 21.5 |

*Not an example of this invention.

TABLE 6

| | Sample Designation | | | | | |
|---|---|---|---|---|---|---|
| | 7 | 8 | 9 | 10 | 11 | F* |
| T-Peel Strength, N/mm | 9.0 | 9.0 | 10.4 | 9.2 | 10.6 | 7.2 |
| Porosity Rating[1] | 2 | 2 | 2 | 2 | 2 | 1 |

*Not an example of this invention.
[1] 1. Porous through adhesive layer. 2. Porosity only at the edges of the adhesive layer.

The data in Table 6 shows the effect of varying the epoxy resin. Good results are obtained when the epoxy resin mixture contains 90% by weight or more polyphenol polyglycidyl ethers, even when some diluent is present (Example 11). Conversely, including a large amount (about 40% of the epoxy resin mixture) of another epoxy resin (Comparative Sample F) leads to a large increase in porosity and large loss in T-peel strength.

What is claimed is:

1. A one-component, heat-curable epoxy adhesive comprising in admixture:
   A) 45 to 75 weight percent, based on the weight of the epoxy adhesive, of a mixture of non-rubber-modified epoxy resins containing at least 80% by weight of a polyphenol polyglycidyl ether or a mixture of two or more polyphenol polyglycidyl ethers, wherein the mixture of non-rubber-modified epoxy resins is a liquid at 23° C. and has an epoxy equivalent weight of 175 to 250;
   B) 12 to 25 weight percent, based on the weight of the epoxy adhesive, of core-shell rubber particles;
   C) 5 to 25 weight percent, based on the weight of the epoxy adhesive, of one or more particulate inorganic fillers that include calcium oxide, wherein the calcium oxide constitutes at least 5 weight percent of the weight of the epoxy adhesive; and
   D) two or more latent epoxy curing agents including a first latent epoxy curing agent that becomes activated when heated to a temperature within the range of 60 to 120° C. and a second epoxy curing agent that becomes activated when heated to a temperature of at least 140°

C., the two or more epoxy curing agents together being present in an amount sufficient to cure the epoxy adhesive, wherein the epoxy adhesive contains no more than 2 weight percent, based on the weight of the mixture of non-rubber-modified epoxy resins, of elastomeric compounds terminated in epoxy or epoxy-reactive groups and/or which contain urethane and/or urea groups.

2. The one-component, heat curable epoxy adhesive of claim 1, further comprising a latent catalyst.

3. The one-component, heat-curable epoxy adhesive of claim 2 wherein the second latent epoxy curing agent that becomes activated when heated to a temperature of at least 140° C. includes one or more of dicyandiamide, methyl guanidine, dimethyl guanidine, trimethyl guanidine, tetramethyl guanidine, methylisobiguanidine, dimethylisobiguanidine, tetramethylisbiguandidine, heptamethylisobiguanidine, hexamethylisobiguanidine, acetoguanamine and benzoguanamine.

4. The one-component, heat-curable epoxy adhesive of claim 3 wherein the first latent epoxy curing agent that becomes activated when heated to a temperature within the range of 60 to 120° C. includes at least one of ethylene diamine, diethylene triamine, triethylene tetraamine and tetraethylene pentaamine blocked with a blocking group selected from one or more of phenol, an alkyl-substituted phenol, benzyl alcohol, an alkyl-substituted benzyl alcohol, or an aliphatic carboxylic acid having 2 to 20 carbon atoms.

5. The one-component, heat curable epoxy adhesive of claim 2 wherein the mixture of non-rubber-modified epoxy resins includes at least one liquid diglycidyl ether of bisphenol A, at least one solid diglycidyl ether of bisphenol A and at least one liquid or solid diglycidyl ether of bisphenol F, and up to 5% monohydrolyzed species that are present as impurities in one or more of the non-rubber-modified epoxy resins.

6. The one-component, heat curable epoxy adhesive of claim 2 wherein component (C) includes fumed silica.

7. The one-component, heat curable epoxy adhesive of claim 2 wherein the mixture of non-rubber-modified epoxy resins, the core-shell rubber particles, the particulate inorganic fillers, the latent curing agents and latent curing catalyst together constitute at least 93% by weight of the epoxy adhesive.

8. The one-component, heat curable epoxy adhesive of claim 1 wherein the mixture of non-rubber-modified epoxy resins, the core-shell rubber particles, the particulate inorganic fillers and the two or more latent curing agents together constitute at least 93% by weight of the epoxy adhesive.

9. The one-component, heat curable epoxy adhesive of claim 1 containing no more than 1 weight percent, based on the weight of the epoxy adhesive, of elastomeric compounds terminated in epoxy or epoxy-reactive groups and/or which contain urethane and/or urea groups.

10. The one-component, heat curable epoxy adhesive of claim 1 containing no more than 0.25 weight percent, based on the weight of the epoxy adhesive, of elastomeric compounds terminated in epoxy or epoxy-reactive groups and/or which contain urethane and/or urea groups.

11. A method comprising forming a layer of an epoxy adhesive of claim 1 at a bondline between two substrates, and curing the layer to form an adhesive bond between the two substrates.

12. The method of claim 11 including the steps of applying the epoxy adhesive onto one of the substrates in the form of a bead having a cross-sectional area of 20 mm$^2$ or less, exposing the bead to air containing at least 5 g of water vapor per cubic meter for a period of at least 48 hours, then applying the second substrate to the adhesive bead to form an adhesive layer at a bondline and curing the adhesive layer at the bondline to form the adhesive bond.

* * * * *

UNITED STATES PATENT AND TRADEMARK OFFICE
CERTIFICATE OF CORRECTION

| | | |
|---|---|---|
| PATENT NO. | : 11,624,012 B2 | Page 1 of 1 |
| APPLICATION NO. | : 16/340934 | |
| DATED | : April 11, 2023 | |
| INVENTOR(S) | : Eagle | |

It is certified that error appears in the above-identified patent and that said Letters Patent is hereby corrected as shown below:

In the Claims

In Column 16, Line 4, "claim 2" should read "claim 1"

Signed and Sealed this
Ninth Day of May, 2023

*Katherine Kelly Vidal*

Katherine Kelly Vidal
*Director of the United States Patent and Trademark Office*